United States Patent [19]

Burford et al.

[11] 4,017,847
[45] Apr. 12, 1977

[54] LUMINOUS INDICATOR WITH ZERO STANDBY POWER

[75] Inventors: Thomas Maynard Burford, Summit; George Raymond Westerman, Denville, both of N.J.

[73] Assignee: Bell Telephone Laboratories, Incorporated, Murray Hill, N.J.

[22] Filed: Nov. 14, 1975

[21] Appl. No.: 631,921

[52] U.S. Cl. .............................. 340/336; 315/131; 340/324 R
[51] Int. Cl.[2] ......................................... G09F 9/32
[58] Field of Search ...................... 340/336, 324 R; 315/161, 164, 171, 131, 170

[56] References Cited
UNITED STATES PATENTS

| | | | |
|---|---|---|---|
| 2,345,135 | 3/1944 | Lippman | 307/157 |
| 3,789,362 | 1/1974 | Prolss et al. | 340/147 R |
| 3,872,463 | 3/1975 | Lapeyre | 340/324 R |

Primary Examiner—Marshall M. Curtis
Attorney, Agent, or Firm—J. S. Cubert

[57] ABSTRACT

In a luminous indicator circuit, a plurality of luminous elements are connected in series relation to form a series circuit which is supplied through a constant current device. A solid state switching device is placed in parallel with each luminous element (e.g., LED). A control circuit including switches connected to a D.C. source determines the conduction of each solid state switch, so that the associated luminous element is controlled independently of the other luminous elements in the series circuit. The control circuit includes switching means which supplies voltage to the indicator circuit only when at least one luminous element is activated. Circuit protection against unwanted transient voltages is provided.

4 Claims, 4 Drawing Figures

4,017,847

LUMINOUS INDICATOR WITH ZERO STANDBY POWER

BACKGROUND OF THE INVENTION

Our invention relates to indicating and display apparatus and more particularly to indicator circuits using luminous elements in switching and control systems.

In switching, control and other electronic systems, visual indicators are generally utilized for display and control purposes. Each visual indicator displays the status of a particular system function or the state of a device and may comprise a plurality of luminous elements and associated electronic circuitry. Typical control systems may employ several dozen lamps to display the system status, and typical switching systems, such as telephone offices, may include several hundred lamps to provide visual indication of the status of equipment used to route calls through the office.

Generally, each indicator circuit comprises a luminous element, such as a light-emitting diode (LED), placed in series with a resistor and a switching device. The switching device may comprise transistors or other semiconductor elements. A plurality of such circuits are paralleled and connected to the available voltage source to assure proper lumination for the expected variations in element characteristics. Such arrangements, however, are relatively inefficient, owing to the power loss in each series dropping resistor. Even a moderate power loss in an individual circuit results in a relatively high power loss where several hundred circuits are used.

One way to reduce the power requirements of the indicator circuits is to transform the high voltage available into a lower voltage, thereby reducing the series dropping resistor loss. This method, however, requires the use of additional equipment, high current capacity devices to accomplish the voltage transformation, and involves a power loss in the transformation equipment. Additionally, there is a minimum voltage usable in the indicator circuits because of the variations in the electrical characteristics of the luminous elements, and there is a minimum current which must be supplied to the luminous elements to assure sufficient illumination for visual display purposes. It is an object of the invention to provide an economical indicator circuit for a plurality of independently operative luminous elements with improved efficiency.

SUMMARY OF THE INVENTION

The invention is directed to an indicator circuit in which a plurality of luminous elements are series connected and powered through a constant current device. A switching device is associated with each luminous element to selectively control current flow therethrough. Each switching device includes a selectively conductive path, which path is placed in parallel with the associated luminous element. The luminous element is illuminated responsive to the associated switching device being nonconductive and is nonluminous responsive to the associated switching device being conductive. In this manner, each of the series connected luminous elements is controlled independently of the other series connected elements.

According to one aspect of the invention, each luminous element is a light-emitting diode (LED) having an anode and a cathode, and each switching device comprises a semiconductor device having first, second, and control electrodes. The first electrode is connected to the associated LED anode and the second electrode is connected to the associated LED cathode. Responsive to a first signal applied to the control electrode, a conductive path is established between the first and second electrodes, whereby the associated LED is nonluminous. Responsive to a second signal applied to the control electrode, the path between the first and second electrodes is rendered nonconductive, whereby the associated LED is illuminated. Control of each LED is independent of the other LEDs in the series connection.

According to yet another aspect of the invention, each semiconductor device comprises a transistor having a collector, an emitter, and a base, said emitter being connected to the LED anode and said collector being connected to the LED cathode. The transistor base is connected to the switchable constant current source to provide the first and second signals for control of the illumination of the associated LED.

According to yet another aspect of the invention, power source supplying the series-connected LEDs is selectively connected to the series circuit responsive to a second signal being applied to at least one switching device control electrode, whereby power is removed from the indicator circuit in the event that no series LED is illuminated.

DETAILED DESCRIPTION

Figure 1:
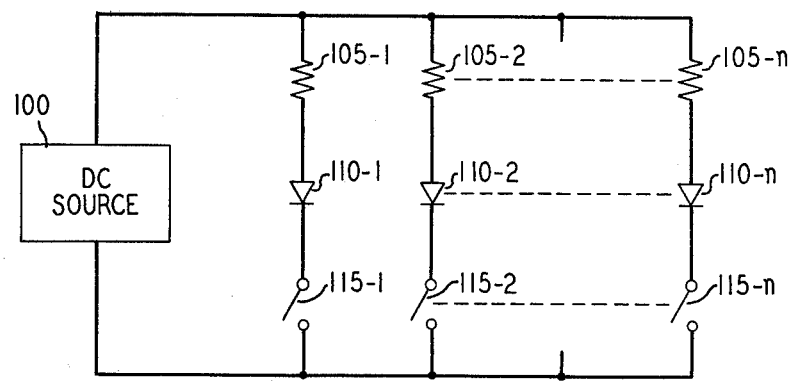
FIG. 1 shows a prior art indicator circuit utilizing LEDs.

FIG. 1 shows a prior art indicator circuit in which d.c. source 100 supplies power to indicator LEDs 110-1 through 110-n. Resistor 105-1 and switch 115-1 are placed in series with LED 110-1. Similarly, resistor 105-2 and switch 115-2 are series connected with LED 110-2, and resistor 105-n and switch 115-n are series connected with LED 110-n. When switch 115-1 is closed, current flows through the series circuit including resistor 105-1, LED 110-1, and switch 115-1. LED 110-1 is illuminated to display the closed state of switch 115-1. It is to be understood that switch 115-1 may be a transistor or an electronic circuit arranged to provide a current path as is well known in the art. Voltage dropping resistor 105-1 is selected to control the current through LED 110-1, and the resistor is chosen to account for variations in the voltage obtained from source 100 and variations in the electrical characteristics of LED 110-1. Typically, source 100 provides a relatively high voltage and the power loss through resistor 105-1 is significant. When all of the LEDs of the circuit of FIG. 1 are illuminated, the power loss may be relatively high.

Figure 2:
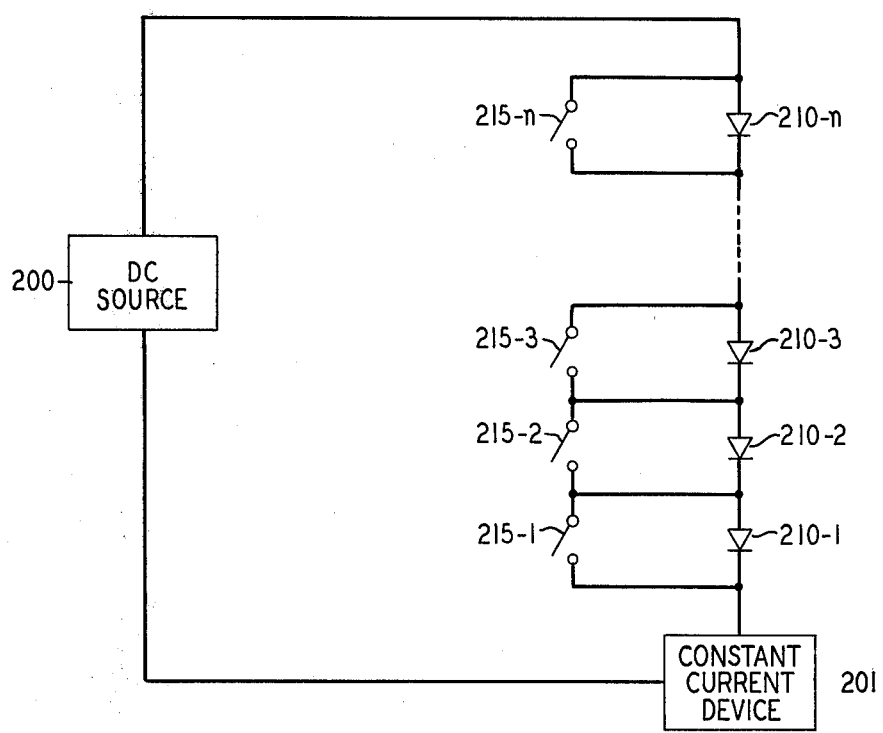
FIG. 2 depicts an indicator circuit illustrative of the invention in which each of a plurality of series-connected LEDs is independently controlled.

FIG. 2 shows an LED indicator circuit in which LEDs 210-1 through 210n are series connected. D.C. source 200 is connected to the LEDs via constant current device 201. The current in constant current device 201 is preselected to provide sufficient illumination of the LEDs. Switch 215-1 is connected in parallel with LED 210-1. Switch 215-2 is connected in parallel with LED 210-2; switch 215-3 is connected in parallel with LED 210-3; and switch 215-n is connected across LED 210-1. Each switch provides an alternate path for the constant current determined by device 201. When switch 215-n is closed, the current flows through switch 215-n and LED 210-n is bypassed, whereby LED 210-n is not illuminated. The current is then available to the other LEDs in the series connection. Switches 215-1 through 215-3 provide similar control for their respective LEDs. Thus, if all of switches 215-1 through 215-n are closed, none of LEDs 210-1 through 210-n are illuminated.

The opening of any switch in the circuit of FIG. 2 forces current flow through the associated LED, which current flow causes said associated LED to be illuminated. If all of switches 215-1 through 215-n are open, all LEDs in the circuit are illuminated. As can be readily seen, each LED is controlled independently of the remaining LEDs in the series connection. Advantageously, there is no voltage dropping resistor used and only a single current flows through the chain, whereby power loss is minimal. Where $v$ is the voltage of d.c. of source 100, a current $i$ is needed to illuminate each LED. If $n$ LEDs are illuminated, the power dissipated in the prior art circuit of FIG. 1 is $niv$. In the circuit of FIG. 2, the maximum power dissipation is $iv$, where $v$ is the voltage of source 200. The voltage $v$ of source 200 may be the same value as the voltage of source 100. In this manner, a plurality of LEDs may be independently controlled with a substantially lower power dissipation.

Figure 3:
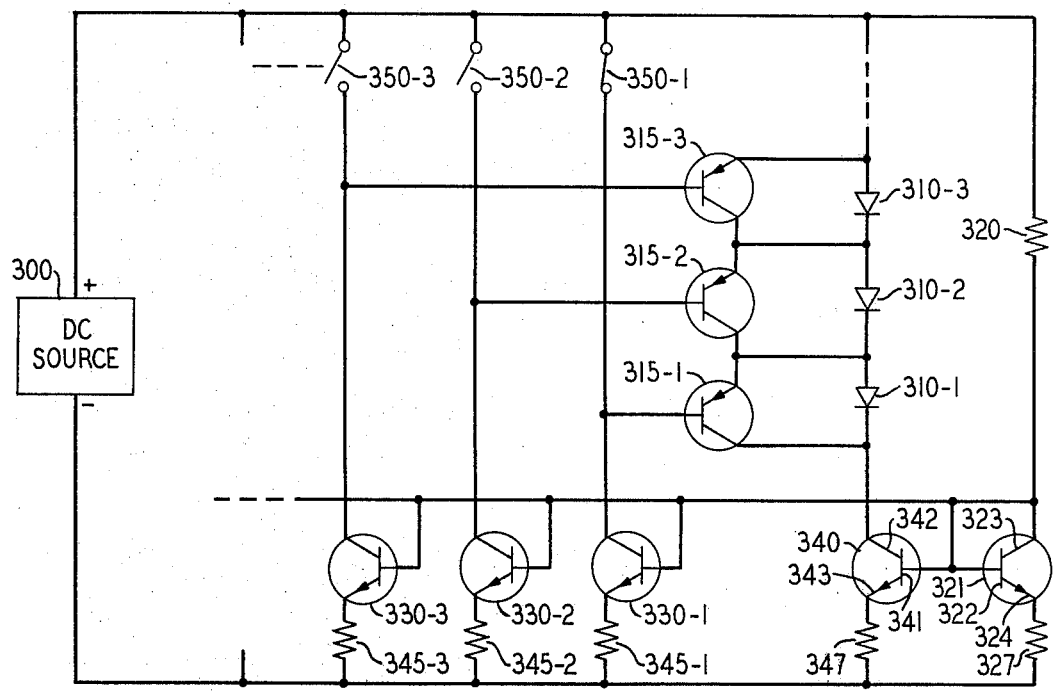
FIG. 3 depicts another indicator circuit illustrative of the invention in which each of a plurality of series-connected LEDs is controlled by a transistor switching circuit.

In FIG. 3, d.c. source 300 supplies current to a plurality of series-connected LEDs including LEDs 310-1 through 310-3 via the constant current including NPN transistors 321 and 340. Base 322 is connected to collector 323 so that transistor 321 operates as a diode. Emitter 324 is connected to one terminal of source 300 via resistor 327 and collector 323 is connected to the other terminal of source 300 via resistor 320. In this manner, the voltage at base 322 is relatively fixed responsive to the collector current determined by resistor 320. Since base 322 is connected to base 341 of transistor 340 and emitter 343 is connected to one terminal of source 300 via resistor 347, the emitter current in 340 is determined. The current into collector 342 is thereby fixed and collector 342 provides this constant current for the series-connected LEDs. In this manner, the appropriate constant current is selected for operation of the series-connected LEDs and said constant current is controlled under varying conditions.

PNP transistor 315-1 has its emitter connected to the anode of LED 310-1 and its collector connected to the cathode of LED 310-1. Similarly, the emitter of PNP transistor 315-2 is connected to the anode of LED 310-2 and the collector of transistor 315-2 is connected to the cathode of LED 310-2. The emitter-collector path of PNP transistor 315-3 is similarly connected across LED 310-3 and the dotted line between source 300 and the anode of 310-3 represents similarly arranged transistors and LEDs. The bases of NPN transistors 330-1, 330-2, and 330-3 are commonly connected to base 322 and the emitters of these transistors are connected to one terminal of source 300 via resistors 345-1, 345-2, and 345-3, respectively. NPN transistors 330-1 through 330-3 provide constant current sources for transistors 315-1 through 315-3, respectively. The current in each of these constant current sources is selected by the value of resistors 345-1 through 345-3 so that the current for each of the bases of PNP transistors 315-1 through 315-3 is relatively low compared to the current for the series-connected LEDs.

Switches 350-1 through 350-3 control the operation of LEDs 310-1 through 310-3, respectively. As shown, switch 350-1 is closed so that the voltage at the base of PNP transistor 315-1 is relatively high, whereby the emitter-collector path of transistor 315-1 is nonconductive. Switches 350-2 and 350-3 are open so that current is supplied to the emitter-base paths of PNP transistors 315-2 and 315-3 from the collectors of NPN transistors 330-2 and 330-3. Transistors 315-2 and 315-3 are conductive whereby current is diverted around LED 310-3 and LED 310-2. Since transistor PNP 315-1 is nonconductive, the constant current determined by transistor 340 flows through LED 310-1 and this LED is activated. Closing switch 350-2 renders PNP transistor 315-2 nonconductive so that both LEDs 310-1 and 310-2 are illuminated. Similarly, if switch 350-3 is closed, PNP transistor 315-3 is nonconductive whereby LED 310-3 is also conductive. As can readily be seen, each of the series LEDs is independently controlled via its PNP transistor and associated NPN constant current source. In this manner, any LED, or combination of LEDs, of the series-connected arrangement may be illuminated.

Figure 4:
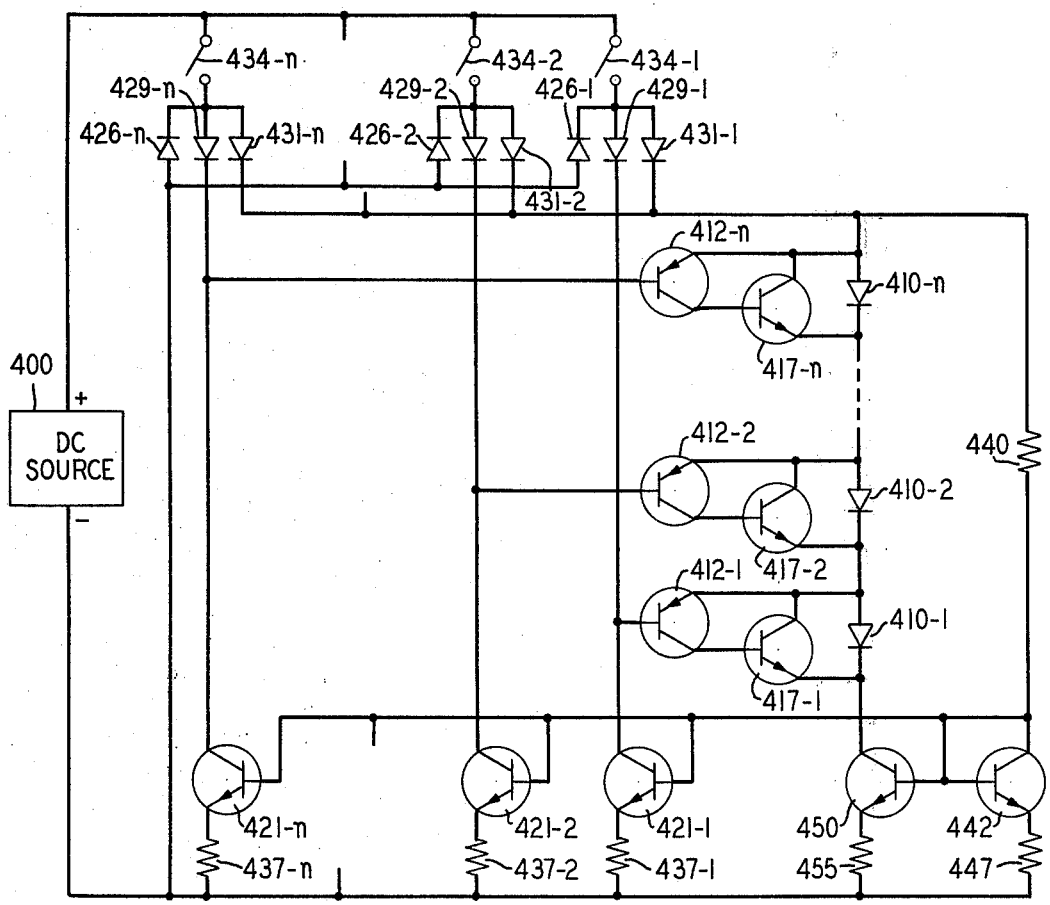
FIG. 4 depicts another indicator circuit illustrative of the invention in which power is supplied to a plurality of series-connected LEDs only if at least one LED is to be illuminated.

When all LEDs in FIG. 3 are nonluminous, the constant current devices are still operative. FIG. 4 shows another series-connected LED indicator circuit in which all power is removed in the event that no LED is to be illuminated. In FIG. 4, d.c. source 400 provides current to the plurality of series-connected LEDs including LEDs 410-1 through 410-n. Constant current determining NPN transistors 421-1 through 421-n and 442 and 450 control the current supplied to the circuit. Impedance 440 provides a relatively predetermined constant current to the collector of NPN transistor 442 in the event that one or more of switches 434-1 through 434-n are closed. The collector and the base of NPN transistor 442 are directly connected whereby transistor 442 is operative as a diode supplying the transistor emitter current to impedance 447. The base of NPN transistor 450 is directly connected to the base of NPN transistor 442 so that the voltage at the base of NPN transistor 450 is determined by the current in impedance 447 and the base-emitter voltage drop of NPN transistor 442. The voltage at the emitter of NPN transistor 450 is applied to impedance 455 whereby the emitter current of NPN transistor 450 is determined. As is well known in the art, the current of transistor 450 is substantially the same as the emitter current which is determined by impedance 455. In this manner, a constant current of a predetermined value is provided for LEDs 410-1 through 410n.

The base of each of NPN transistors 421-1 through 421n is connected to the base of NPN transistor 442 so that a constant current source is provided at the collectors of these transistors. The magnitude of the current at the collector of each of NPN transistors 421-1 through 421-n is determined by the impedance connected to the emitter of the respective one of NPN transistors 421-1 through 421-n. In the circuit of FIG. 4, the collector current of each of NPN transistors 421-1 through 421-n is substantially smaller than the collector current of NPN transistor 450.

LED 410-1 is connected in parallel with the collector-emitter path of NPN transistor 417-1 so that LED 410-1 is bypassed when transistor 417-1 is conductive. PNP transistor 412-1 has its emitter connected to the anode of LED 410-1 and its collector connected to the base of NPN transistor 417-1. PNP transistor 412-1 operates as a current amplifier to provide adequate drive to the base of NPN transistor 417-1 so that the collector emitter path of NPN transistor 417-1 effectively bypasses LED 410-1 when the transistor is conductive. PNP transistor 412-2 and NPN transistor 417-n are connected to LED 410-n in similar manner.

Assume for purposes of illustration that each of switches 434-1 through 434-n is open. In this event, d.c. source 400 is disconnected from the indicator circuit and there is no power applied to the indicator circuit. When switch 434-1 is closed, d.c. source 400 is connected to resistor 440 and to one end of the series-connected LEDs by diode 431-1. Diode 429-1 is rendered conductive whereby the voltage at the base of PNP transistor 412-1 is raised so that PNP transistor 412-1 is biased to its nonconductive state and NPN transistor 417-1 is rendered nonconductive. Diodes 429-n through 429-2 are nonconductive and PNP transistors 412-n through 412-2 conduct through NPN transistors 421-n through 421-2, respectively. Consequently, NPN transistors 417-n through 417-2 are highly conductive whereby no current passes through LEDs 410-n through 410-2. The current from the emitter of NPN transistor 417-2 flows through LED 410-1 and this LED is illuminated. Diode 426-1 provides overvoltage protection when switch 434-1 is closed.

When switches 434-1 and 434-2 are both closed, NPN transistors 417-1 and 417-2 are turned off but transistor 417-n and the other transistors paralleling LEDs are fully conductive. Thus, the predetermined constant current into the series-connected LEDs flows through NPN transistor 417-n rather than LED 410-n but the predetermined current flows through LEDs 410-2 and 410-1 whereby these LEDs are illuminated. With switches 434-1 through 434-n closed, NPN transistors 417-1 through 417-n are nonconductive whereby the predetermined constant current flows through all the series-connected LEDs and all the LEDs are illuminated. In accordance with the invention, each of series connected LEDs 410-1 through 410-n is individually controlled so that any combination of LEDs may be illuminated. A single current source is utilized for the series-connected LEDs and the single current is selectively diverted from nonilluminated LEDs through transistor switches. Each transistor switch is controlled by a constant current source and the transistor switch incorporates an intermediate current amplifier to insure adequate current bypass for the controlled LED.

The invention has been described with reference to particular illustrated embodiments. It is to be understood that the illustrative embodiments described are given by way of example only and that numerous modifications may be devised by those skilled in the art without departing from the spirit and scope of the invention.

What is claimed is:

1. An indicator circuit comprising a plurality of LED elements each having an anode and a cathode, said LEDs being connected in like polarity series relation to form a series circuit having an anode end and a cathode end; a voltage source having first and second terminals; a switching device for each LED comprising a path connected in parallel with said LED and a control electrode; first means connected to said control electrode for applying a first signal to said control electrode for rendering said path conductive and for applying a second signal to said control electrode for rendering said path nonconductive; each first means comprising a switch having first and second terminals, a first diode having an anode and a cathode, a first transistor having a collector, an emitter and a base, and a first impedance; said voltage source first terminal being connected to said switch first terminal; said switch second terminal being connected to said first diode anode; said first diode cathode being connected to said first transistor collector and to said control electrode; said first transistor emitter being connected to said voltage source second terminal through said first impedance; means for applying a predetermined current to said series circuit only when at least one of said switches is closed comprising a plurality of second diodes each having an anode and a cathode, a second transistor and a third transistor each having a collector, an emitter and a base, and second, third and fourth impedances; one second diode anode being connected to the second terminal of one of said switches; the cathode of each second diode being connected to the anode end of said series LED circuit and to said second transistor collector through said second impedance; said second transistor collector being connected to said second transistor base, the base of each first transistor, and the base of said third transistor; said second transistor emitter being connected through said third impedance to the voltage source second terminal; said third transistor collector being connected to the cathode end of said series LED circuit; and said third transistor emitter being connected to said voltage source second terminal through said fourth impedance.

2. An indicator circuit according to claim 1 wherein each switching device comprises fourth and fifth transistors each having a collector, an emitter and a base; said fourth transistor emitter being connected to said fifth transistor collector and to said LED anode; said fourth transistor collector being connected to said fifth transistor base; said fourth transistor base being connected to said first diode cathode; and said fifth transistor emitter being connected to said LED cathode.

3. A luminous indicator circuit according to claim 2 further including a plurality of third diodes each having an anode and a cathode, each third diode being associated with one of said switches, each third diode anode being connected to said voltage source second terminal; each third diode cathode being connected to the second terminal of the associated one of said switches.

4. An indicator circuit comprising a plurality of LEDs each having an anode and a cathode, said LEDs being connected in like polarity series relation to form a series circuit having an anode end terminal and a cathode end terminal, a voltage source having first and second terminals, a switching device associated with each LED comprising a selectively conductive path connected in parallel with said associated LED and a control electrode for controlling the conductive state of said path, first means connected to said control electrode for applying a first signal to said control electrode to render said path conductive and for applying a second signal to said control electrode to render said path nonconductive, means connected between said voltage source second terminal and said series circuit cathode end terminal for applying a controlled current to said series LED circuit, and means connected between said voltage source first terminal and said series LED circuit anode end terminal responsive to a second signal being applied to at least one of said switching devices for applying voltage from said voltage source to said series LED circuit whereby voltage is removed from said indicator circuit when all of said LEDs are nonluminous.

* * * * *